United States Patent

Sommer

(10) Patent No.: US 8,839,921 B2
(45) Date of Patent: Sep. 23, 2014

(54) PRESSURE PLATE ASSEMBLY AND METHOD FOR POWER TRANSMISSION

(71) Applicant: Martin Sommer, Weimar (DE)

(72) Inventor: Martin Sommer, Weimar (DE)

(73) Assignee: Schunk Bahn-und Industrietechnik GmbH (DE)

( * ) Notice: Subject to any disclaimer, the term of this patent is extended or adjusted under 35 U.S.C. 154(b) by 0 days.

(21) Appl. No.: 13/627,652

(22) Filed: Sep. 26, 2012

(65) Prior Publication Data

US 2013/0081915 A1    Apr. 4, 2013

(30) Foreign Application Priority Data

Sep. 29, 2011  (EP) ..................... 11007929

(51) Int. Cl.
*B60L 5/38* (2006.01)
*B60L 5/08* (2006.01)

(52) U.S. Cl.
CPC .... *B60L 5/38* (2013.01); *B60L 5/08* (2013.01)
USPC .......................................... 191/49; 191/45 R

(58) Field of Classification Search
USPC ........ 191/45 R, 46, 47, 48, 49; 104/202–209, 104/279
See application file for complete search history.

(56) References Cited

U.S. PATENT DOCUMENTS

| 1,754,016 | A | * | 4/1930 | Hershberger | 191/49 |
|---|---|---|---|---|---|
| 1,872,351 | A | * | 8/1932 | Schaake et al. | 191/49 |
| 2,161,100 | A | * | 6/1939 | Sierk | 191/49 |
| 2,892,904 | A | * | 6/1959 | Sierk | 191/49 |
| 2,967,915 | A | * | 1/1961 | Dean | 191/49 |
| 3,114,441 | A | * | 12/1963 | Sprigings | 191/69 |
| 3,123,191 | A | * | 3/1964 | Sprigings | 191/58 |
| 3,509,292 | A | * | 4/1970 | Dehn | 191/49 |
| 3,672,308 | A | * | 6/1972 | Segar | 104/246 |
| 3,740,498 | A | * | 6/1973 | Herbert | 191/49 |
| 3,752,274 | A | * | 8/1973 | Falkiner-Nuttall | 191/49 |
| 3,767,868 | A | * | 10/1973 | Storrer | 191/49 |
| 3,786,204 | A | * | 1/1974 | Laurent | 191/48 |
| 3,804,996 | A | * | 4/1974 | Monteith | 191/1 R |
| 3,821,497 | A | * | 6/1974 | Laurent | 191/57 |
| 4,023,658 | A | * | 5/1977 | Sierk | 191/49 |
| 4,042,081 | A | * | 8/1977 | Pier | 191/8 |
| 4,155,434 | A | * | 5/1979 | Howell, Jr. | 191/22 R |
| 4,168,770 | A | * | 9/1979 | Segar et al. | 191/57 |
| 4,464,546 | A | * | 8/1984 | Culver | 191/49 |
| 4,572,929 | A | * | 2/1986 | Nitschke et al. | 191/29 R |
| 5,673,774 | A | * | 10/1997 | Trapp et al. | 191/49 |
| 6,152,273 | A | * | 11/2000 | Kilkenny | 191/58 |
| 7,188,716 | B2 | * | 3/2007 | Lamschick | 191/49 |
| 2011/0139561 | A1 | * | 6/2011 | Sommer | 191/49 |

* cited by examiner

*Primary Examiner* — Jason C Smith
(74) *Attorney, Agent, or Firm* — Quarles & Brady LLP

(57) ABSTRACT

A pressing device for a current collector moves a contact shoe unit is movable relative to a current rail. The pressing device includes a rocker unit and a spring unit. The spring unit having a helical spring rotatably biasing rocker unit is rotatable such that the contact shoe unit is movable into a sliding contact position in only one direction spring unit.

5 Claims, 4 Drawing Sheets

1

PRESSURE PLATE ASSEMBLY AND METHOD FOR POWER TRANSMISSION

CROSS REFERENCE TO RELATED APPLICATION

The present application claims the benefit of European Patent Application No. 11007929.0 filed Sep. 29, 2011, which is fully incorporated herein by reference.

STATEMENT REGARDING FEDERALLY SPONSORED RESEARCH OR DEVELOPMENT

Not applicable.

FIELD OF THE INVENTION

The invention relates to a pressing device for a current collector, a current collector and a method for the transfer of energy from a current rail to a vehicle, wherein the pressing device is designed such that a contact shoe unit of the current collector is movable relative to the current rail by means of the pressing device and is pressable in a sliding contact position against the current rail with a pressing force for producing a sliding contact, wherein the pressing device comprises a rocker unit, wherein the rocker unit is designed so as to be rotatable such that the contact shoe unit, by creating a pressing force, is movable in only one direction into a sliding contact position, wherein the rocker unit comprises a spring unit for creating a pressing force.

BACKGROUND OF THE INVENTION

Pressing devices or current collectors of this kind are well known in the art and are regularly used on track vehicles for transferring electrical energy from a current rail to the vehicle. The current rail is usually arranged in the vicinity of the driving rails and is often called the third rail. With known current collectors a contact shoe is attached to a rocker wherein the rocker presses the contact shoe with a defined pressing force against a sliding contact surface of the current rail. The contact shoe is brought into contact with the current rail by driving the contact shoe onto the current rail via a starting ramp, wherein the rocker is then pressed back via the contact shoe, thus resulting in the spring unit applying the necessary pressing force.

U.S. Pat. No. 3,740,498 has disclosed such a pressing device, wherein here the spring unit comprises a rubber element. A rotatable rocker unit is designed such that it is able to move a contact shoe unit or a contact shoe up or down between two stops relative to the current rail. The rubber element of the spring unit is rotatably connected with a shaft wherein by rotating and fixing the shaft the rubber element can be tensioned against a stop resulting in the desired pressing force being achieved by forming a sliding contact with the current rail and moving the contact shoe unit or rocker unit against the initial tension.

The disadvantage when using a rubber element as a spring unit consists in that the rubber element loses its spring effect relatively quickly and requires frequent replacement. Furthermore the rubber element is unable to provide for an adequate mounting of the contact shoe unit relative to the current rail. The contact shoe unit can be moved not only up and down but also back and forth in longitudinal direction of the current rail. It is also necessary to pre-tension the rubber element in order to be able to generate an adequate pressing force. It is therefore possible that during operation of the current rail the sliding contact is interrupted if the contact shoe unit moves in an undesirable manner or that a sufficient pressing force fails to be applied upon the current rail.

SUMMARY OF THE INVENTION

The present invention is therefore based on the requirement to propose a pressing device for a current collector, a current collector and a method for the transfer of energy from a current rail to a vehicle, with which a reliable operation is made possible.

This requirement is met by a pressing device for a current collector transferring energy from a current rail to a vehicle The pressing device moves a contact shoe unit of the current collector relative to the current rail and presses the contact shoe in a sliding contact position against the current rail for producing a sliding contact. The pressing device includes a rocker unit including a spring unit. The spring unit has a helical spring rotatably biasing the rocker unit about an axis, such that the contact shoe unit is movable in only one direction into a sliding contact position.

The pressing device according to the invention for a current collector for the transfer of energy from a current rail to a vehicle is designed such that by means of the pressing device a contact shoe unit of the current collector is movable relative to the current rail and is pressable with a pressing force against the current rail in a sliding contact position for producing a sliding contact, wherein the pressing device comprises a rocker unit, wherein the rocker unit is designed so as to be rotatable such that the contact shoe unit, while creating a pressing force, is movable in only one direction into a sliding contact position, wherein the rocker unit comprises a spring unit for creating a pressing force, wherein the spring unit comprises a helical spring.

By using a helical spring for the spring unit it is possible to generate a comparatively large pressing force. A helical spring may be pre-tensioned over a prolonged period of time without the danger of losing its springiness. Compared to a rubber element therefore, replacement of the helical spring is required less often. Furthermore, by using a helical spring for the spring unit, it is possible to achieve a much more stable positioning of the contact shoe unit relative to the current rail. The contact shoe unit is then exposed to fewer undesirable vibrations and movements.

Preferably the helical spring may be relaxed in a rest position of the rocker unit. When using a helical spring which is very strong it is no longer necessary to pre-tension the spring unit or the rocker unit for achieving the desired spring force. Also the helical spring may be constructed in such a way that the windings of the helical spring lie adjacent to each other when in the rest position, thereby allowing a spring force to be created by means of the helical spring in only one rotary direction relative to the longitudinal axis of the helical spring.

Further, the spring unit may comprise a shaft, wherein the helical spring is non-rotatably connected with the shaft. This will ensure reliable guidance of the components of the spring unit, wherein then the helical spring may be rotatably mounted on the shaft. The shaft may then also be the axis of rotation for the rocker unit.

The helical spring may be connected with the shaft by means of a spring holder non-rotatably mounted on the shaft. The spring holder may, for example, be designed as a sleeve or disc and may be arranged on the shaft. The non-rotatable connection of spring holder and shaft may be designed, among others, as a positively locking connection, such as a keyway connection or as a polygon formed by the shaft, such as a hexagon. Or the spring holder may be designed in one piece with the shaft. To connect the spring holder and the helical spring one winding end of the helical spring may simply be inserted into a longitudinal bore of the spring holder in longitudinal direction of the shaft resulting again in a positively locking connection. Thus the spring holder may form a stop or a carrier for the helical spring.

In order to permit attachment of the pressing device to a track vehicle, the pressing device may comprise a holding unit, wherein the holding unit can then be used to attach the rocker unit to a carrier device of the current collector. The rocker unit may be attached to the holding unit such that an axis of rotation is formed between the rocker unit and the holding unit. Or the holding unit may be designed such that the pressing device is height-adjustable relative to the current rail. This makes it possible to better adjust the contact shoe to match a height of the current rail.

The rocker unit may comprise a rotatably mounted sleeve on the holding unit which sleeve surrounds the spring unit. This allows the spring unit to be protected in a simple way against environmental influences and against contamination. The sleeve may be arranged on the holding unit such that a longitudinal axis of a sleeve corresponds to an axis of rotation of the rocker unit.

In an advantageous embodiment the sleeve may form an attachment unit for the contact shoe unit. This makes it possible to mount an arm or cantilever of the contact shoe unit in a simple way on the attachment unit, for example by screwing. This allows the contact shoe unit or a contact shoe to be easily replaced.

The helical spring may be coupled to the sleeve in such a way that rotation of the sleeve relative to the holding unit creates a pressing force. The helical spring may then also be coupled to the holding unit, wherein the pressing force can then be created in only one direction.

Advantageously the sleeve may be connected to the helical spring by means of a spring connector rotatably mounted on the shaft. The spring connector may be designed in a similar way to the spring holder such that one winding end of the helical spring engages with the spring connector in a positively locking manner. Furthermore the spring connector may be non-rotatably connected with the sleeve. This may be achieved, for example, by a simple screw which is screwed into the spring connector transversely to the longitudinal axis of the rocker unit. This will also allow simple assembly or disassembly of the pressing device and replacement of the helical spring.

Also, the sleeve may thereby be rotatably mounted on the shaft in an especially simple way.

Furthermore the sleeve may be rotatably mounted on the spring holder by means of a sliding bush arranged in-between. A simple ring-shaped bush serving as a bearing for rotating the sleeve about the shaft may be arranged on the spring holder. Thus the sleeve may be mounted on the sliding bush and the shaft in the area of a possibly present spring connector at the respective ends of the sleeve. Tilting of the sleeve transversely to the shaft can thereby be effectively avoided. It also prevents the contact shoe unit from swinging in longitudinal direction of the current rail such as it may occur when using rubber bearings.

In order to fix the shaft relative to the carrier device it is advantageous if the shaft can be non-rotatably fixed on the holding unit. The shaft may, for example, be clamped to the holding device or it may be rotatably attached to the carrier device by creating a tensile force on the shaft. The tensile force may be created by means of the holding unit. As such it may be sufficient to provide a screw thread with a nut at one end of the shaft which serves to tension the shaft. At an opposite end of the shaft form elements for receiving a tool such as a hexagon may be provided. A turn of the shaft then also offers the possibility of creating a rest position for the contact shoe unit.

Furthermore the shaft may comprise a clamping section which may be fixed to a clamping element of the holding unit. The clamping element may, for example, be implemented as a clip and may encompass a circumference of the clamping section. Tightening the clip, for example by means of a screw, has the effect of creating a frictional connection between a shaft and the holding unit. Thus by applying a radial force to the shaft it is easy to create a connection between shaft and holding unit.

In an embodiment of the invention, the pressing unit forms part of a current collector for the transfer of energy from a current rail to a vehicle. The current collector comprises a contact shoe which forms a contact shoe surface.

Another embodiment of the invention is a method for the transfer of energy from a current rail to a vehicle. The method includes moving a contact shoe unit of the current collector relative to the current rail using the pressing device, and pressing the contact shoe unit against the current rail.

BRIEF DESCRIPTION OF THE DRAWINGS

The invention will now be explained in detail with reference to the attached drawings, in which.

DETAILED DESCRIPTION OF THE EXAMPLE EMBODIMENTS

Figure 1:
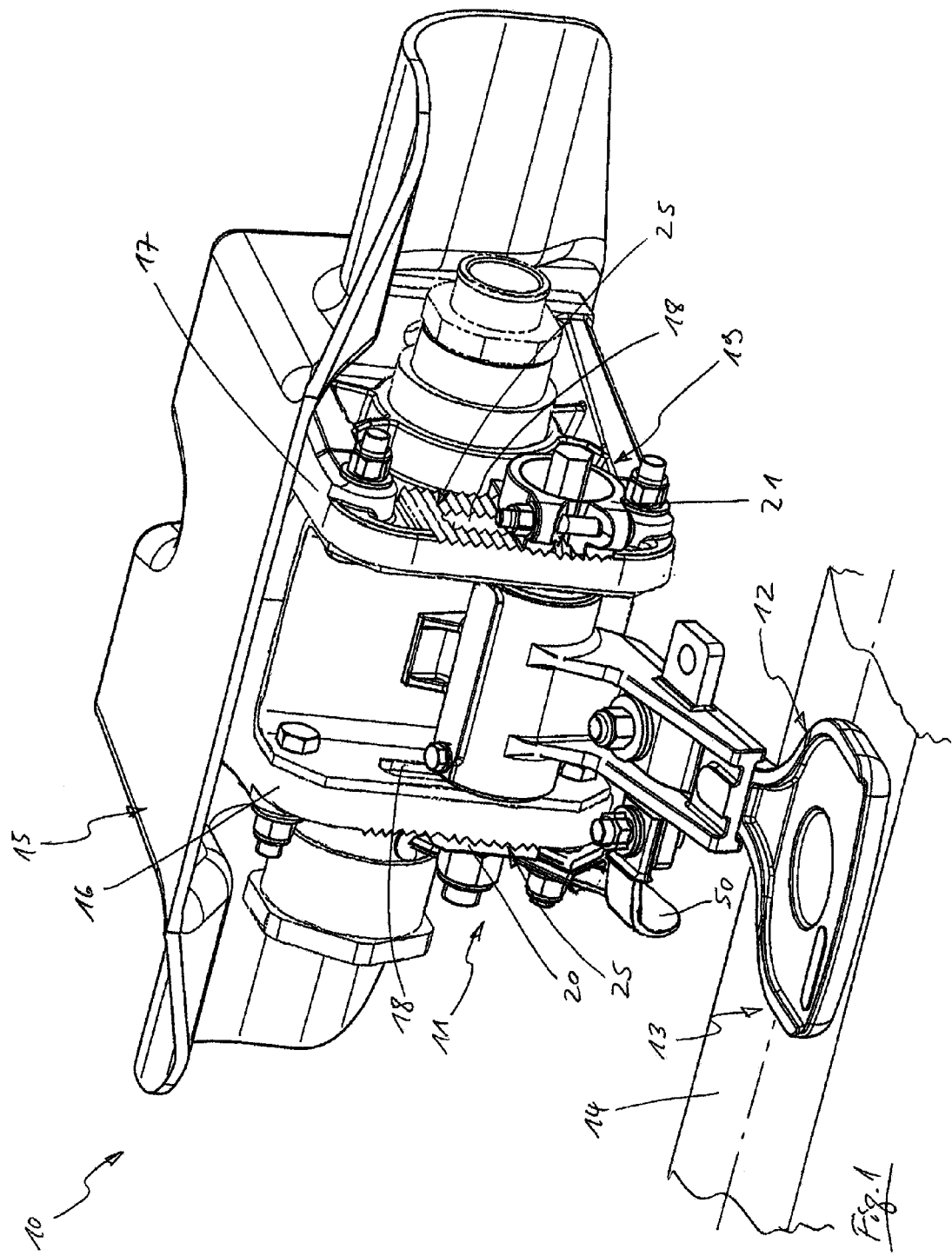
FIG. 1 shows a perspective view of a current collector with a pressing device.

FIG. 1 shows a current collector 10 with a pressing device 11 and a contact shoe unit 12. A sliding contact 13 is formed by pressing the contact shoe unit 12 of the current collector 10 against a current rail 14 of which a section is shown here. The current collector further comprises a carrier device 15 formed essentially of two vertically arranged parallel plates 16 and 17. A longitudinal groove 18 is formed in each of the plates 16 and 17. The pressing device 11 comprises a holding unit 19 for connection with the carrier device 15. The holding unit 19 further comprises a first clamping element 20 and a second clamping element 21. Both clamping elements 20 and 21 comprise a groove-shaped locking profile 24 on a supporting surface 22, 23, which locking profile matches a locking profile 25 on the plates 16 and 17. This enables the clamping elements 20 and 21 to be positioned and clamped fast exactly opposite the plates 16 and 17 without the clamping elements 20 and 21 becoming displaced.

Figure 2:
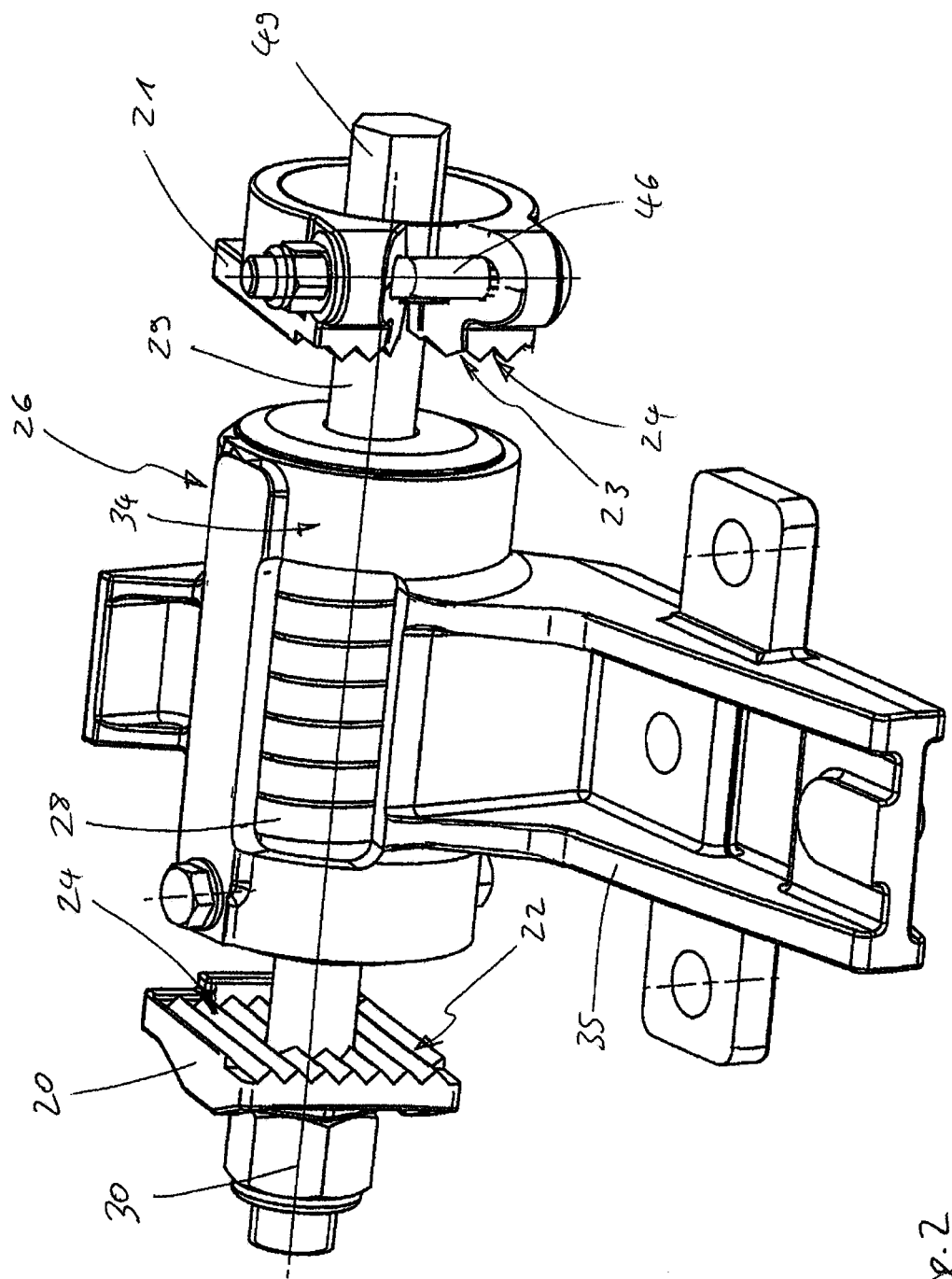
FIG. 2 shows a perspective view of the pressing device.
Figure 3:
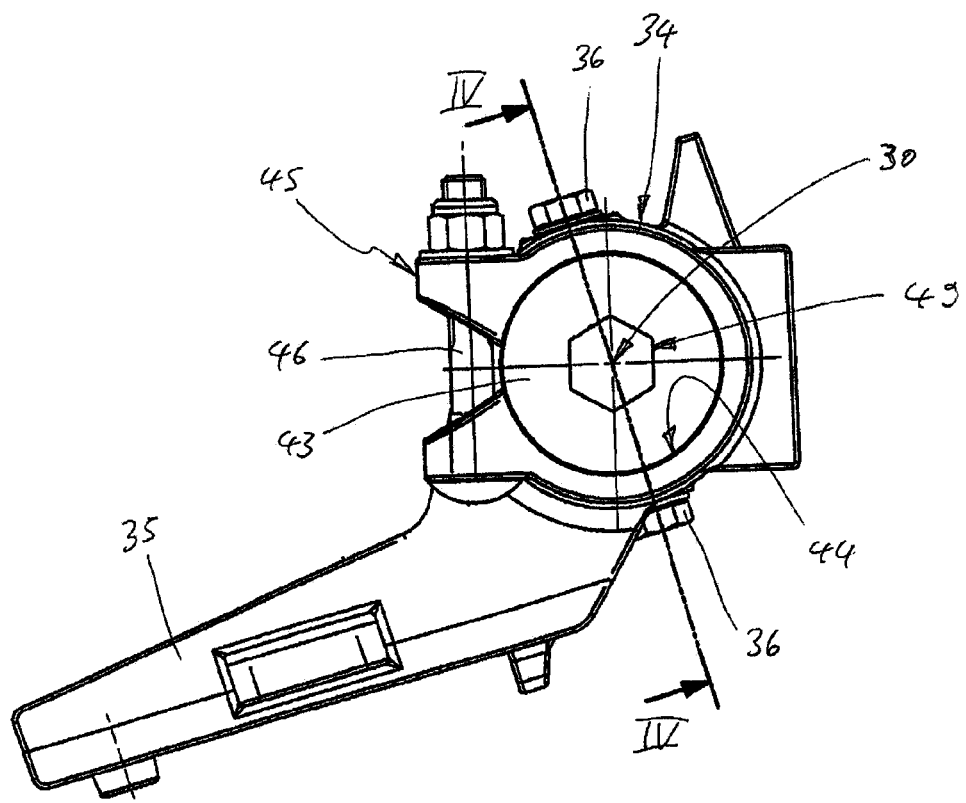
FIG. 3 shows a side view of the pressing device from the right.
Figure 4:
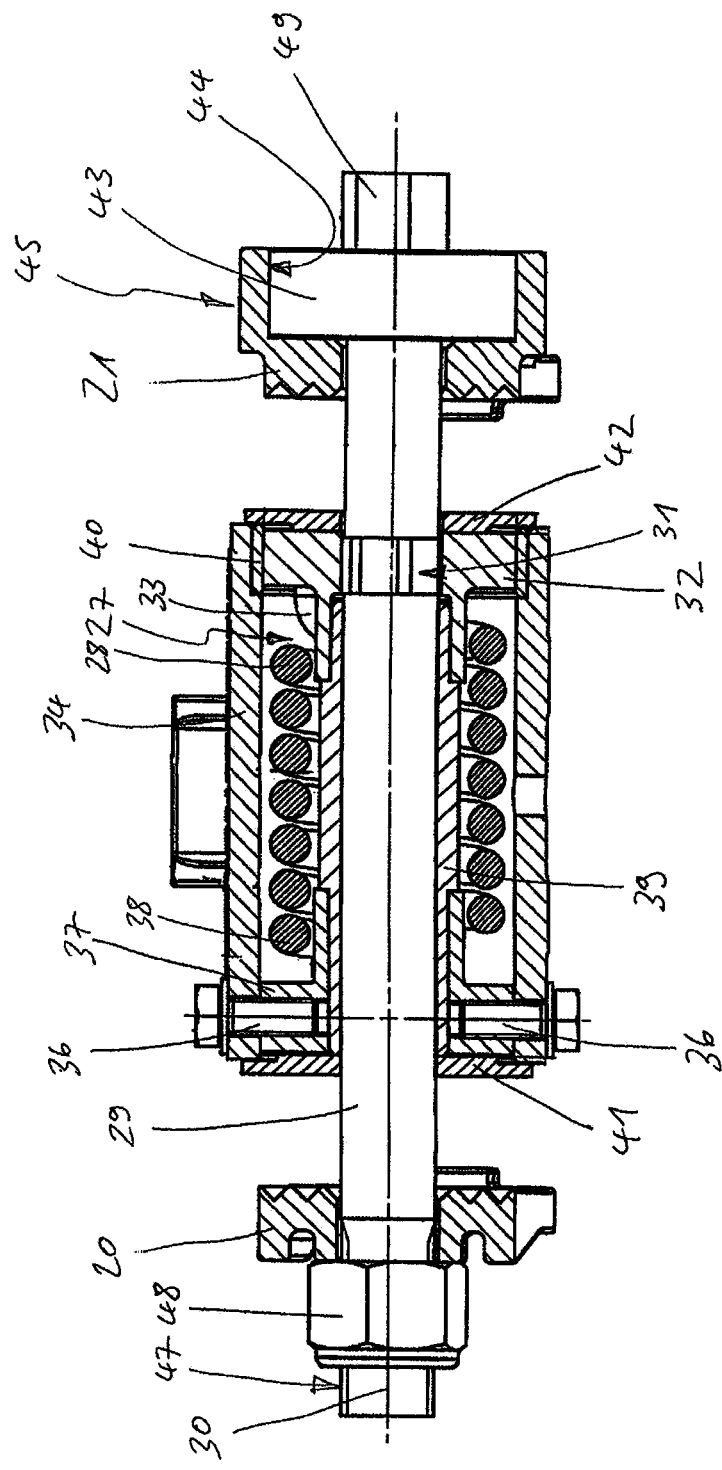
FIG. 4 shows a sectional view of the pressing device along a line IV-IV of FIG. 3.

FIGS. 2 to 4 represent various views of the pressing device 11 and should be viewed in conjunction with each other. The pressing device 11 comprises a rocker unit 26 with a spring unit 27, wherein a pressing force of the contact shoe unit 12 can be generated by means of a helical spring 28 of spring unit 27 only in direction of current rail 14. The spring unit 27 further comprises a shaft 29 which forms an axis of rotation 30 for the rocker unit 26. On shaft 29 a hexagon 31 is formed, on which a spring holder 32 is arranged in a positively locking and non-rotatable manner. One winding end 33 of the helical spring 28 engages in the spring holder 32 in a positively locking manner such that the helical spring 28 is non-rotatably connected with the spring holder 32 and thus with the shaft 29.

The rocker unit 26 further comprises a sleeve 34 which surrounds the spring unit 27. An attachment means shaped as arm 35 is molded onto the sleeve for arranging and attaching the contact shoe unit 12. The sleeve 34 is non-rotatably connected with a spring connector 37 by means of two screws 36, and the spring connector in turn is rotatable about the shaft 29. The spring connector 37 is connected in a positively locking manner with an opposite winding end 38 of helical spring 28.

Furthermore, a sliding bush 39 is arranged on the shaft 29, on which sliding bush the spring connector 37 is rotatable essentially without play. A further sliding bush 40 is arranged on the spring holder 32, on which the sleeve 34 is rotatable without play. This allows the sleeve 34 together with the contact shoe unit 12 to be pivoted or rotated relative to the axis of rotation 30 about an angle of rotation not shown in detail, in one direction of rotation against a spring force generated by the helical spring 28, which corresponds to the pressing force.

The shaft 29 is provided with discs 41 and 42 which are supported against the plates 16 and 17. The shaft 29 further comprises a clamping section 43 which is adapted to match an inner diameter 44 of the second clamping element 21. The second clamping element 21 is designed as a clip 45 and can be clamped onto the clamping section 43 by means of a screw 46 by reducing the inner diameter 44.

On the shaft 29 a screw thread 47 is provided with a nut 48. To set a relative position of the contact shoe unit 12 in relation to the current rail 14, the shaft 29 may be pivoted about the axis of rotation 30 into the desired position of the contact shoe unit 12 by engaging a spanner not shown on a hexagon 49 of shaft 29. The screw 46 is then tightened thereby clamping the shaft 29 relative to the axis of rotation 30 via the clip 45 by means of the holding unit 19. Then follows tightening of the nut 48 so that a tensile force is created in shaft 29 between the clamping section 43 and the screw thread 47, which force clamps the shaft 29 between plates 16 and 17 thus securing it against any rotation. The discs 41 and 42 press against the sliding sleeve 39 and the spring holder 32 so that these also are braced against each other. The rotatability of sleeve 34 is not affected by this action. In other respects the arm 35 is electrically connected with the carrier device 15 via a connecting cable 50.

The invention claimed is:

1. A pressing device for a current collector transferring energy from a current rail to a vehicle, wherein the pressing device moves a contact shoe unit of the current collector relative to the current rail presses the contact shoe in a sliding contact position against the current rail for producing a sliding contact, wherein the pressing device comprises:
   a holding unit, wherein the holding unit attaches the rocker unit to a carrier device of the current collector; and
   a rocker unit including a spring unit, the spring unit having a helical spring rotatably biasing the rocker unit about an axis, such that the contact shoe unit is movable in only one direction into a sliding contact position, the spring unit including a shaft, wherein the helical spring is non-rotatably connected with the shaft, and the rocker unit comprises a sleeve surrounding the spring unit and rotatably mounted on the holding unit.

2. The pressing device according to claim 1, in which the sleeve includes an attachment unit for the contact shoe unit.

3. The pressing device according to claim 1, in which the helical spring is coupled to the sleeve, such that rotating the sleeve relative to the holding unit causes a pressing force biasing the rocker unit.

4. The pressing device according to claim 1, in which the sleeve is connected with the helical spring by a spring connector rotatably arranged on the shaft.

5. The pressing device according to claim 1, in which the sleeve is rotatably mounted on the spring holder by a sliding bush arranged in-between the sleeve and spring holder.

* * * * *